Oct. 29, 1963  J. HENRY-BAUDOT  3,109,114
MULTIPLE-WINDING ELECTRICAL ROTATING MACHINES
Filed April 11, 1960  2 Sheets-Sheet 1
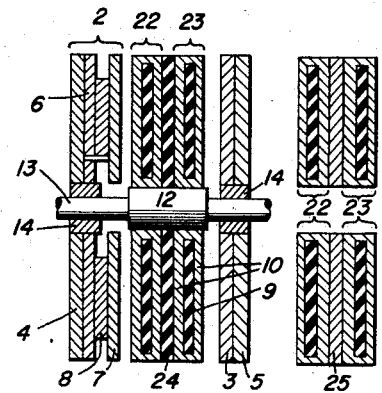
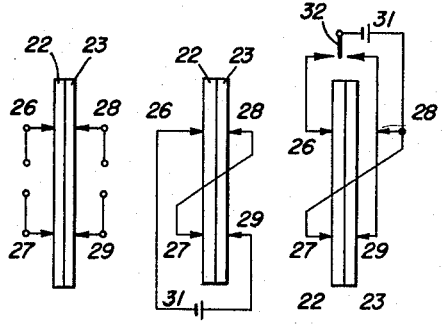
Fig.1.  Fig.2.  Fig.3.  Fig.4.  Fig.5.
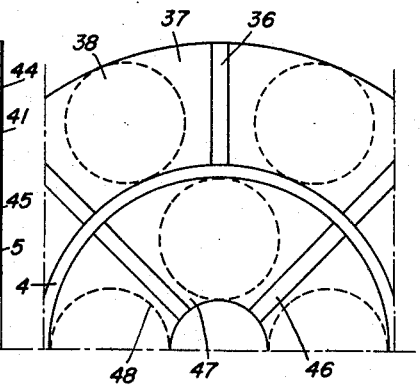
Fig.6.  Fig.7.  Fig.8.
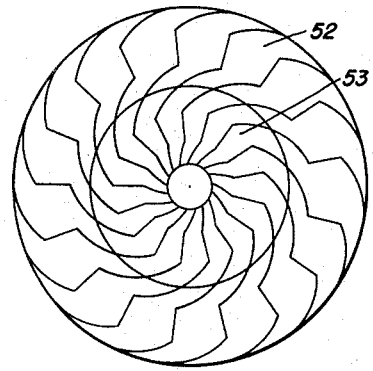
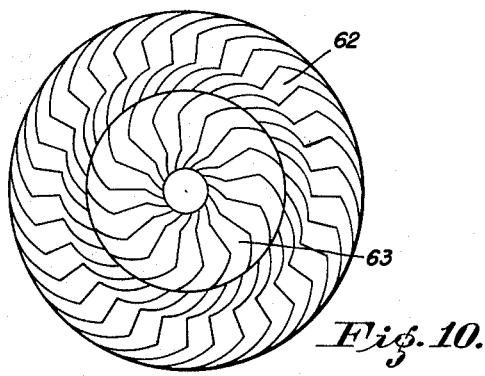
Fig.9.  Fig.10.
INVENTOR
JACQUES HENRY BAUDOT
BY Kemon, Palmer, Stewart
& Estabrook
ATTORNEYS

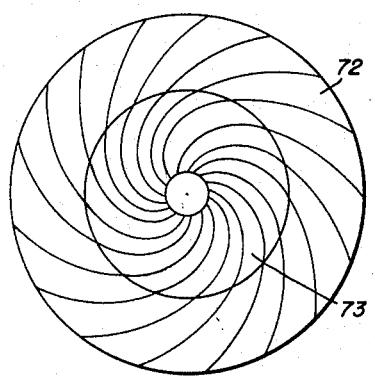
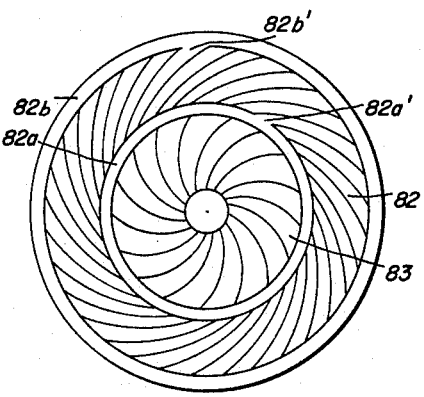
Fig. 11.  Fig. 12.
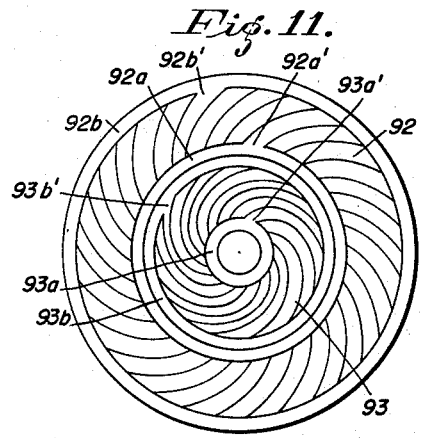
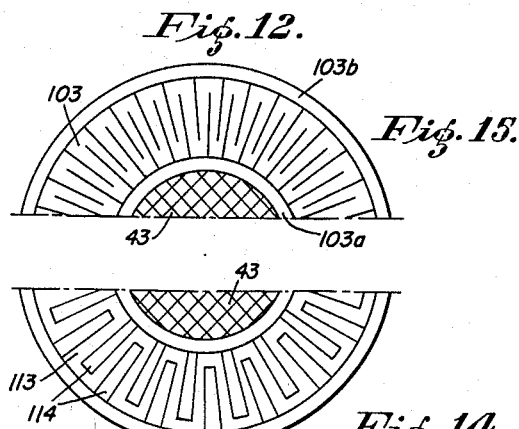
Fig. 13.  Fig. 15.
Fig. 14.
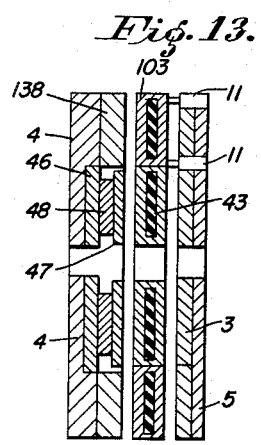
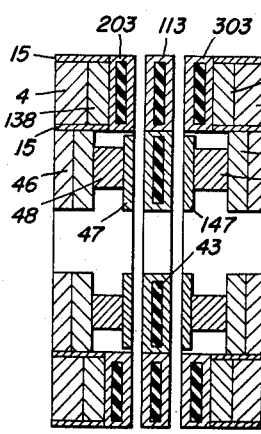
Fig. 16.  Fig. 17.
INVENTOR
JACQUES HENRY BAUDOT
BY
ATTORNEYS United States Patent Office 3,109,114
Patented Oct. 29, 1963

3,109,114
MULTIPLE-WINDING ELECTRICAL
ROTATING MACHINES
Jacques Henry-Baudot, Antony, France, assignor to
Printed Motors, Inc., New York, N.Y.
Filed Apr. 11, 1960, Ser. No. 21,222
Claims priority, application France Oct. 2, 1959
6 Claims. (Cl. 310—268)

The present invention concerns improvements in or relating to electrical rotating machines of the type having axial air-gaps between disk-shaped rotor and stator members which carry so-called "printed windings," i.e. windings formed of flat conductors applied by a circuit printing technique, or by a similar process, so that the flat conductors strongly and intimately adhere to a thin insulating endless carrier, the conductors being formed and distributed on opposite faces of the carrier as two sets of half-turns which are interconnected according to any required pattern or type of winding. Machines of this type are disclosed in my co-pending application Ser. No. 1,128, filed January 7, 1960, which is based in part upon application 691,434, filed October 21, 1957.

An object of the present invention is to provide a substantial enlargement of the field of practical use of such machines without loss of their compactness and efficiency characteristics.

According to the invention, machines of the above mentioned kind are mainly characterised in that they are provided with multiple-winding members, each of such members being a mechanical unit in itself and comprising at least two electrically distinct "printed" windings. Such a member may be used equally well as a stator or a rotor member.

According to one embodiment, the multiple windings are axially aligned or piled; in such embodiment, the inductor part of the machine may provide a single magnetic circuit for the winding carrier member.

According to another and preferred form of the invention, the multiple windings are arranged in concentric relation, one winding carrier arranged within the other; in such embodiment, the inductor part of the machine may provide either a single magnetic circuit for the said winding carrier member or it may provide as many distinct magnetic flux circuits as there are separate windings on the said member.

Such multiple winding machines according to the invention provide the following features or advantages, among others:

(1) Increase of the power of the machine by the serial interconnection of the windings;

(2) Easy control of the direction of rotation of the machine, through a selective energization of the windings;

(3) Direct display and measurement of the speed of the machine, by using one of the windings as a tachometer winding;

(4) Adjustable speed control of the machine through energization of the windings in various combinations;

(5) Production of dynamotors, inverters and the like (including D.C. to D.C., A.C. to A.C. and D.C. to A.C. and A.C. to D.C. electromechanical conversion).

All these features are not necessarily obtained when the multiple windings are axially aligned but all of them may be obtained when the multiple windings are concentrically mounted; other combinations of features being, obviously, possible to obtain by providing the multiple winding member with both axially aligned windings and concentrically arranged windings.

The invention will be fully explained with reference to the accompanying drawings, wherein:

FIGS. 1 and 2 show a two-winding member according to the present invention, the windings being "piled" or aligned in the axial direction of the machine;

FIGS. 3, 4 and 5 show examples of electrical circuit connections for the windings of machines according to the invention; from these, and referring to embodiments such as those of FIGS. 1 and 2, the corresponding circuits for the machines of FIGS. 6 to 13 will be obvious.

FIGS. 6 and 7 show respective half cross-sections of machines according to the invention wherein the two windings are arranged concentrically; FIG. 6 shows a single inductor structure for both windings, and FIG. 7 shows separate inductor structures for the two windings;

FIG. 8 is a face view of part of the two-inductor structure for the machine of FIG. 7;

FIGS. 9 to 13, inclusively, show various examples of multiple-winding members for the machines of FIGS. 6 and 7; these patterns relating to variations in the number of conductors, poles, and kind of electrical current (D.C. and A.C.);

FIGS. 14 and 15 more specifically relate to machines according to the invention for the generation of a high frequency electrical current, these figures showing half-views of the windings;

FIGS. 16 and 17 show examples of machines utilizing the high frequency windings of FIGS. 14 and 15.

A machine of the kind specified and as shown in FIG. 1, comprises a disc-shaped rotor member mounted between an annular stator inductor member 2 and an annular magnetic yoke member 3. Inductor member 2 may comprise a number of magnetic pole pieces 8 each provided with a sector shaped pole tip 7, mounted on an annular piece 6 of magnetic material; the whole being supported by a fixed mounting plate 4. The magnetic yoke 3 of the stator is carried on a mounting plate 5. The rotor is mounted on a hub 12 affixed to a shaft 13 journalled in bearings 14 in the mounting plates 4 and 5. One of the stator members carries at least one pair of brush holders supporting brushes or sliders or wipers having sliding contact with a winding on the rotor, two pairs of such holders being shown diagrammatically at 26—27 and 28—29 in FIGURE 3.

In the example shown in FIGURE 1 the rotor is formed of two complete winding units 22 and 23 arranged on opposite faces of an insulating carrier disc 24 mounted on the hub 12. Each windnig unit is formed in the manner described in my copending application Serial No. 1,128, the conductors 10 being "printed" over both faces of a thin insulating disc 9. Each set 10 of conductors constitute one set of half-turns of the winding interconnected from face to face by means of conductive bridges through or around the edge portions of the insulating carrier 9. Preferably, the half-turn conductors are shaped and provided to substantially cover the whole of the annular surface of the insulating carrier, the intervals between conductor edges being reduced to the minimum value useful for proper electrical separation therebetween. Each conductor comprises a sectoral radial portion, for instance, extended at both ends by inclined or curved end portions, the two end portions extending in opposite directions for a lap winding and in the same directions for a wave winding. The terminal part of each end portion is connected by a conducting bridge to an end portion of a radial conductor on the opposite face of the insulating support, the two connected radial conductors being spaced apart angularly by one pole spacing. The direction of inclination of the end portions determines the type of winding produced, such as the series-wave winding or the lap or mesh winding.

In such machines, as is known from said co-pending applications, one advantage is that all conductors on one face of the winding are used as commutator segments in D.C. machines so that the separate commutator is eliminated. The brushes or wipers may be set anywhere along two radii separated by one polar step of the machine. As will be obvious, one pair of brushes is sufficient for a series-wave winding, whereas, for a mesh winding, there must be provided as many pairs of brushes as are provided pairs of poles in the machine.

Now, in accordance with the present invention, it is proposed to assemble at least two "printed" windings of similar patterns, but not necessarily identical, on a unitary mechanical member to be used as a rotor or stator in machines of the kind specified.

According to a first mode of execution, these windings are assembled so that they are "stacked" or aligned in the axial direction of the machine, either by being formed on either side of an insulating ring 24, of FIG. 1, or by being affixed on either side of a magnetic supporting ring 25, see FIG. 2. These windings are referred to, as a whole, by the reference numerals 22 and 23.

It will be considered for explanation that these windings are separately energizable by separate pairs of brushes 26—27 for the winding 22, and 28—29 for the winding 23, referring for instance to the electric connection scheme of FIG. 3. When the winding 22 is fed, there is produced across the brushes or wipers of the winding 23 an induced voltage which may be used either for measuring the speed of rotation of the machine (tachometric indicator) or for the supply of a load. This may be done for D.C. as well as for A.C. machines, and of course input may be either A.C. or D.C. and the output D.C. or A.C. Otherwise stated, the machine acts as a motor, from its input and as a generator, for its output.

When the rotor is driven, two separate currents are generated by the windings 22 and 23. As said, the number of conductors may be different so that these currents may not be equal.

When used as a motor, the machine may be operated at three different speeds: one when the winding 22 is fed, and not 23, another one when the winding 23 is fed, and not 22, and a third speed value when both 22 and 23 are fed. Denoting $U_1$ as the voltage across 26—27, $U_2$ as the voltage across 28—29, these three speeds have the respective values: $K/U_1$, $K/U_2$, and $K/(U_1+U_2)$, where K is a constant.

The two windings may be serially connected if required, as shown in FIG. 4, so that when using a single supply source 31, the operating voltage may be increased. In another respect, as shown in FIG. 5, the two windings may be energized by means of a change-over switch 32 for controlling the rotation either in one direction or in the opposite direction of rotation, according to the winding which receives the energizing current.

It is obvious that such a "piling" arrangement may be enlarged to include more than two windings provided the inner ones in the piling extend beyond the outer ones for application thereto of brushes or sliders in the case of rotors. Although the number of conductors and even the types of winding patterns may be somewhat varied, this arrangement does not enable any flexibility in the choice of the number of poles from winding to winding.

On the other hand, this may be accomplished, according to a further feature of the invention, where the multiple winding member is formed with the windings arranged in relative coaxial or concentric relation. With such a concentric relation, further, the air-gap is not unduly widened between the magnetic members in the machine and the efficiency, slightly reduced in the piling arrangement, is not lowered at all.

Concentric windings are shown in FIGS. 6 and 7 at 42 and 43 formed on the outer and inner annular portions of a single annular carrier 41. In FIG. 6, the two windings cooperate with a single inductor structure like that of FIG. 1, each polar flare 7 occupying radially the same span as both spans of the coaxial windings 42 and 43. In FIG. 7, two distinct structures of inductors 36—37—38—44 and 46—47—48—45 respectively cooperate with the windings 42 and 43. In this structure, magnetic pole pieces 38 and 48 are mounted on magnetic rings 36 and 46 respectively and are provided with sector shaped tips 37 and 47. 44 and 45 are magnetic rings serving the same functions as ring 3 in FIG. 1. The concentric winding arrangement is quite an advantage where the windings must be assigned distinct operative functions in the machine, since it is possible to provide different numbers of magnetic poles for different windings. Preferably, the number of poles, in such a case, will be made higher in the outer ring than in the inner one. As a mere example, FIG. 8 shows part of an inductor structure having four poles for the inner ring and eight poles for the outer one.

FIG. 9 shows a front view of a rotor with two concentric windings 52 and 53 for an eight pole machine, with seventeen turns. FIG. 10 shows a front view of a rotor the windings 62 and 63 of which have different numbers of conductors for an identical number of poles. FIG. 11 shows a rotor comprising a four pole winding 73 and an eight pole winding 72. These are merely illustrative and non-limitative examples of embodiments. They relate to D.C. machines.

FIG. 12 shows an illustrative example of a machine having a rotor the inner winding 83 of which is a D.C. winding and the outer winding 82 is an A.C. winding of the type having inner and outer collector rings 82a and 82b respectively; these rings are formed on the same surface as conductors 82, and there is a direct connection between ring 82a and one of the winding conductors at 82a'. Also, there is a direct connection between ring 82b and another winding conductor at 82b'. FIG. 13 shows a rotor having both an A.C. inner winding 93 with collector rings 93a and 93b and an outer A.C. winding 92 with collector rings 92a and 92b. Rings 92a and 92b are directly connected to spaced conductors in winding 92 at points 92a' and 92b'. Also rings 93a and 93b are directly connected to spaced conductors in winding 93 at the points 93a' and 93b'. 93 is a four pole winding and 92 is a sixteen pole winding.

As said above, the invention may be embodied in machines of the A.C. character which generate a high frequency current at a moderate speed. It may then be of advantage to design the outer winding pattern, whatever may be the pattern of the inner winding 43 (see FIGS. 14 and 15), with a specially adapted design of closely spaced sectoral turns forming one complete spiral or winding turn on each face of the insulating carrier. In FIG. 14, 113 is the conductive spiral, and 114 indicates the intervals separating the adjacent radial portions of the turns of the spiral. These intervals or spaces may be filled with magnetic material affixed to the insulating carrier and level with the copper of the turns. For a higher number of poles, or a smaller diameter of ring, the "Greek" spiral may occupy the whole surface of the carrier, thereby reducing the separating intervals to narrow gaps or slits, see winding 103 in FIG. 15.

FIG. 16 shows a cross-section view of a machine using a rotor member of the type such as those of FIGS. 14 and 15. Preferably, the inductor for the outer winding is made of a ferrite ring 138 upon which magnetic poles have been impressed through a suitable and well known process of magnetic treatment. This makes possible the production of an inductor having substantially any desired number of magnetic poles as required (for example, one pole per "flat" turn of the Greek spiral winding). Two brush holders 11, 11 are provided for brushes which engage the collector rings 103a and 103b, see FIG. 15.

More advantageously further, for such high frequency generating machines, and as shown on FIG. 17, the use of brushes may be avoided by providing on either side of the air-gap, over the magnetic rings 138 and 238, windings 203 and 303 strictly identical to winding 113 of the rotor. Terminals 15 and 115 are shown for these stator windings, wherein high frequency current is induced from the rotor winding 113. Of course, here, the stator is in two symmetrical parts on either sides of the rotor, inductors 46—47—48 and 146—147—148 facing the inner winding 43. The support plate 104 corresponds to plate 4 on the other end of the machine and supports the elements 146—148, 238 and 303.

It is evident that the two winding arrangements (the axially aligned windings and the concentric windings) may be used in a single machine.

I claim:

1. A dynamo-electric machine comprising an annular stator member and an annular rotor member mounted to rotate about the axis of said stator member, said members being arranged in axial alignment with a narrow air-gap between them, one of said members including at least two annular windings mounted concentric with said axis and forming a unitary winding structure, each winding being formed upon a thin insulating support having two sets of half-turn conductors secured to opposite faces thereof, the conductors on one face being cross-connected to conductors on the opposite face to form an annular winding presenting a plurality of poles equally spaced about the perimeter of the winding.

2. A machine according to claim 1 wherein said two annular windings are axially aligned.

3. A machine according to claim 1 wherein said two annular windings are arranged in concentric relation, one within the other, in a common plane.

4. A machine according to claim 3 wherein said two windings are embodied in said rotor member and said annular stator member comprises two stator structures arranged in concentric relation, one within the other, and providing separate inductor fields for said two rotor windings.

5. A machine according to claim 4 wherein the outer stator structure presents more magnetic poles than the inner stator structure.

6. A machine according to claim 3 wherein said two windings are embodied in said rotor in concentric relation, one within the other, and a single stator member presents magnetic pole areas extending over both rotor windings.

References Cited in the file of this patent

FOREIGN PATENTS

| | | |
|---|---|---|
| 71,062 | France | Oct. 8, 1959 |
| | (Addition.) | |
| 691,525 | France | July 15, 1930 |
| 842,366 | Germany | June 26, 1952 |